United States Patent [19]

Keller

[11] Patent Number: 5,405,040
[45] Date of Patent: Apr. 11, 1995

[54] CAP FOR FUEL INLET

[76] Inventor: Russell D. Keller, P.O. Box 382, Clackamas, Oreg. 97015

[21] Appl. No.: 42,010

[22] Filed: Apr. 2, 1993

[51] Int. Cl.6 .............................................. B65D 53/00
[52] U.S. Cl. .................................. 220/304; 220/89.4; 220/203; 220/DIG. 33
[58] Field of Search ................... 220/89.4, 201, 202, 220/203, 303, 304, DIG. 32, DIG. 33, 301

[56] References Cited

U.S. PATENT DOCUMENTS

| 1,286,320 | 12/1918 | Hood . | |
|---|---|---|---|
| 2,747,763 | 5/1956 | Sach . | |
| 3,386,611 | 6/1968 | Crute . | |
| 4,482,075 | 11/1984 | Stotz et al. | 220/301 X |
| 4,795,053 | 1/1989 | Kasugai et al. . | |
| 4,796,777 | 1/1989 | Keller | 220/89.4 X |
| 4,913,303 | 4/1990 | Harris . | |
| 5,000,339 | 3/1991 | Wheat et al. | 220/203 |
| 5,031,790 | 7/1991 | Keller . | |
| 5,167,344 | 12/1992 | Van Schitt | 220/288 X |

FOREIGN PATENT DOCUMENTS 0149645  7/1981  Germany ..................... 220/DIG. 33

Primary Examiner—Allan N. Shoap
Assistant Examiner—Jes F. Pascua
Attorney, Agent, or Firm—Kolisch, Hartwell, Dickinson, McCormack & Heuser

[57] ABSTRACT

A cap assembly closing off the filler tube of a cylindrical fuel tank. The filler tube has an annular shoulder defining an inlet opening for the tube. An annular elastomer seal seats within a groove indented downwardly in this shoulder. A spring-biased closure member in a fuel cap seats against this seal. A dust seal is provided in the cap assembly. Roll pins provide a snap acting closure system in the cap assembly.

5 Claims, 1 Drawing Sheet

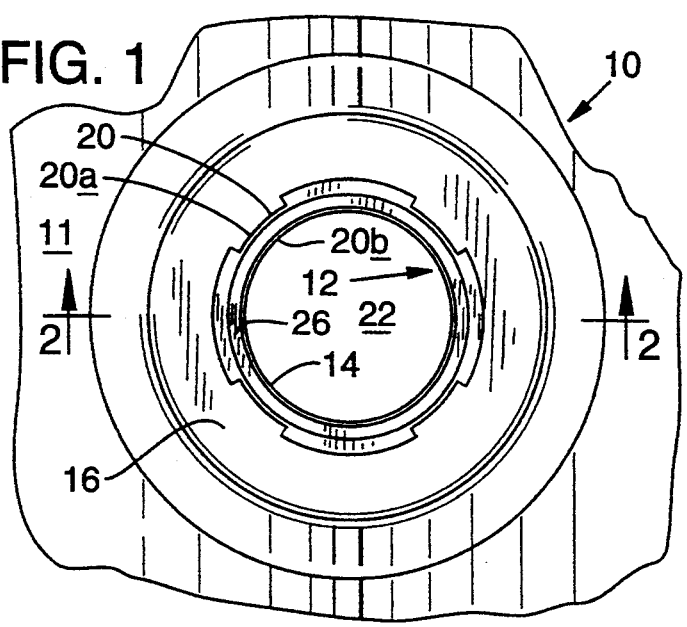
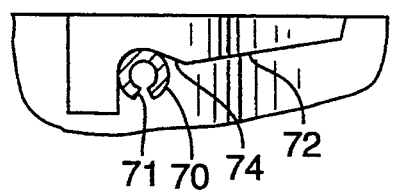
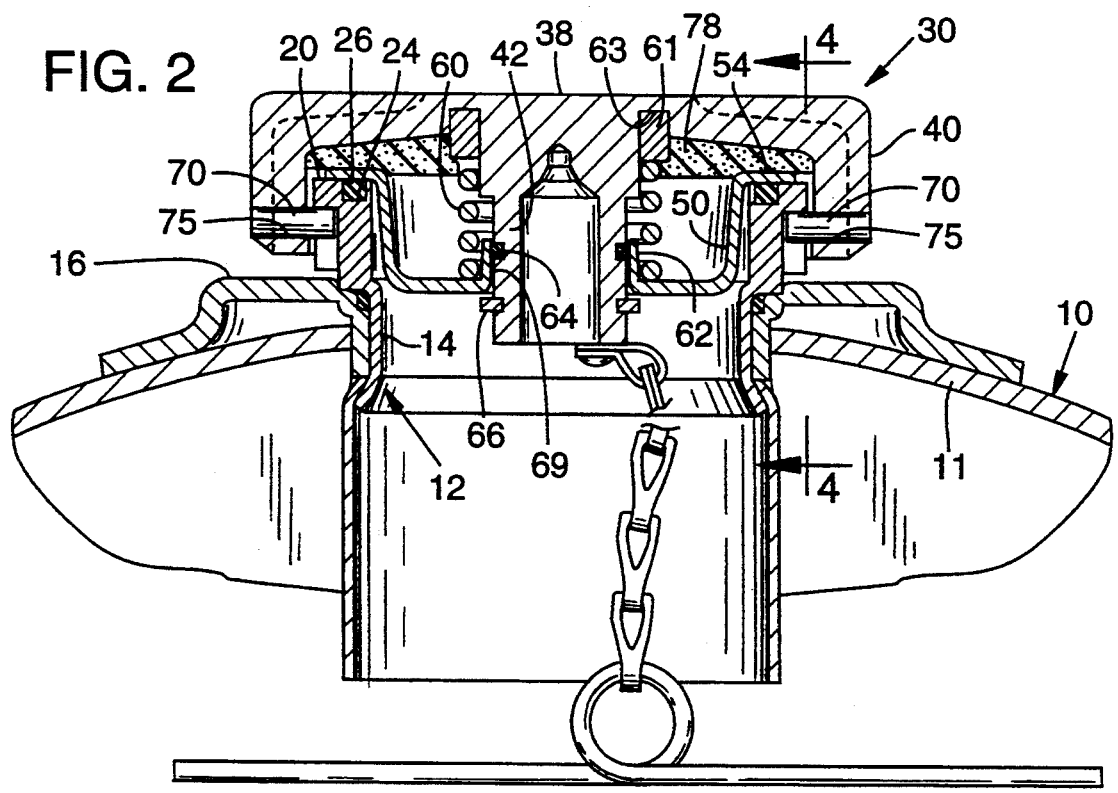
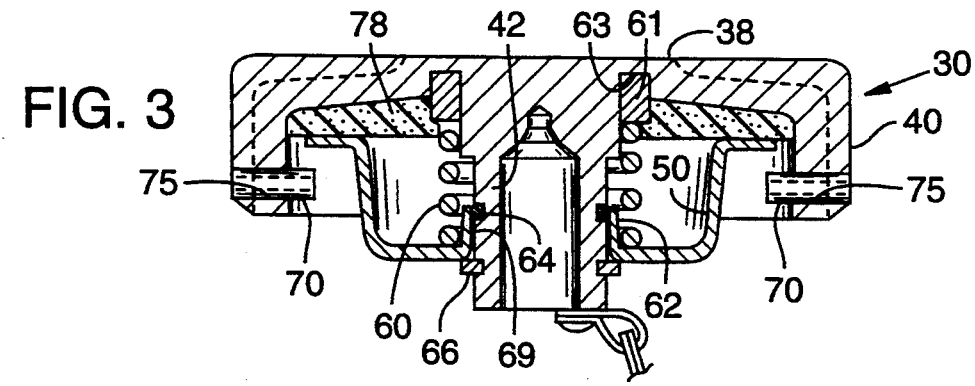

CAP FOR FUEL INLET

BACKGROUND OF THE INVENTION

This invention relates to a fuel cap and its mounting on the open end of a filler tube for a fuel tank.

Describing a particular use for the cap and filler tube herein disclosed, it is common for large vehicles such as trucks adapted for heavy duty performance to be powered by diesel engines with the fuel for running the engine contained in one or more tanks appropriately mounted on the truck. Fuel is admitted to a fuel tank through what is referred to herein as a filler tube, and a removable cap turned on to the open inlet end of the filler tube closes off the filler tube at times other than when fuel is being admitted to the tank. A number of regulations apply to the type of cap which is provided toward the end of minimizing fuel leakage and fire hazards as a result of collision or other vehicle mishap. One regulation is known as the so-called drop test (where, in effect, a load is dropped a given distance onto a cap closing off a filter tube). The fuel cap after the drop test must continue to maintain an effective seal with the filler tube.

Another consideration is that the fuel cap be able to vent a high pressure condition within a tank caused by high temperature conditions (for instance, a fire), to inhibit explosion of the truck.

SUMMARY OF THE INVENTION

One of the objects of the instant invention is to provide an improved construction in the combination of a cap and filler tube for a fuel tank, which is better enabled to withstand the disruptive conditions of a crash or impact situation without fuel leakage occurring.

Another object is to provide such a fuel cap and filler tube combination, featuring an improved construction for controlling fuel leakage, which is nevertheless easily turned to install or remove the cap.

A further feature of the invention is the provision of what is referred to herein as a dust seal which minimizes dust accumulations in the cap during usage.

Yet another object is to provide, in a fuel cap, a novel crimp or roll pin construction for pins provided to lock the cap in place.

A further object is to provide a fuel cap with an improved construction for venting in response to a high temperature condition.

These and other objects and advantages are attained by the invention, which is described hereinbelow in conjunction with the accompanying drawings, wherein:

BRIEF DESCRIPTION OF THE DRAWINGS

FIG. 1 is a view looking downwardly at portions of a fuel tank and showing the upper end of a filler tube employed to introduce fuel to the tank;

FIG. 2 is a cross-sectional view of the tank and tube illustrated in FIG. 1, and further illustrating in cross-section a cap closing off the top of the filler tube;

FIG. 3 is a cross-sectional view of the cap with the cap removed from the filler tube; and FIG. 4 is a view taken along the lines 4—4 in FIG. 2 illustrating details of a pin system employed in the securing the cap to the filler tube.

DETAILED DESCRIPTION OF THE PREFERRED EMBODIMENTS

Referring to the drawings, a portion of a tank such as a fuel tank present on a typical road transport truck is illustrated at 10. Mounted on the tank is a filler tube assembly 12. The assembly includes a filler tube 14 which extends into the interior of the tank and an apron 16 extending about the filler tube. The tube apron and tank wall where the filler tube assembly is located are all suitably joined together as by welding.

As is typical, wall 11 of the fuel tank where the filler tube assembly is located is cylindrically curved. As a consequence, the apron where it fits against the tank wall is provided with a cylindrical curvature approximately complementing the curvature of wall 11 (see FIG. 2).

Filler tube 14 at its upper end is bounded by an annular shoulder 20. The shoulder is relatively wide where it extends between opposite circumferential margins or edges 20a, 20b. The shoulder extends about and defines an opening 22 which connects to the interior of the tank through tube 14 and through which fuel is introduced when filling the tank.

Indented downwardly into shoulder 20 is an annular groove 24. The groove is located approximately midway between bounding edges 20a, 20b. Snugly seated in this groove is an annular ring, of square cross-section, shown at 26. The ring is made of the usual elastomer material which is compressible and resilient, whereby it may provide a proper shield with a closure member pressed thereagainst, as will be described.

Closing off the inlet opening, at periods other then when the tank is being filled with a fuel, is a fuel cap assembly 30.

Describing the fuel cap in greater detail, the assembly includes a cap with a top 38 of generally circular outline. Joined to and depending downwardly from this top is a substantially cylindrical skirt 40. Joined to the underside of the cap top and depending downwardly in an axial direction from its center, is a pillar 42. Mounted on the underside of the cap is a cup-shaped closure member 50. The closure member includes an annular rim 54 forming the outer perimeter of the member.

An opening 69 is defined in the center of the cup portion by sleeve portion 62 which is integral with the cup portion. Pillar 42 of the cap projects downwardly through sleeve portion 62. Providing a seal between the interior of the sleeve portion and the pillar is a ceiling ring 64. A snap ring 66 mounted on the pillar adjacent its base serves as an abutment means limiting downward movement of the closure member with respect to the pillar.

Mounted in a position extending about the pillar with its lower end bearing on the closure member and its upper end bearing on the cap is a coil spring 60. The spring biases the closure member downwardly toward its lower limit position as defined by the snap ring. The spring, however, accommodates yieldably resisted upward movement of the closure member on the pillar. In the construction described, the pillar functions to provide for accurate guided movement of the closure member relative to the cap in a direction extending axially of the cap.

Spring 60 has its upper end as viewed in FIGS. 2 and 3 bearing against a fusible ring 61. Ring 61 seats within a groove 63 provided on the underside of top 38. As an elevated temperature (for instance 190° F.), ring 61 melts permitting spring 60 to enlarge with relaxation of downward pressure on the closure member. This enables the closure member to move upwardly with a pressure condition within the tank thus venting the tank. It should be noted that the temperature and pressure responsive venting system described uses a fusible member which during normal use of the cap is shielded and thus protected by the closure member.

The cap disclosed is what is referred to as a quick-closing cap. This is because the cap to secure it in place on the upper end of the filler tube need be given only a small fraction of a turn with catch structure then engaging establishing an anchored position for the cap.

Further explaining, mounted on skirt 40 are multiple roll pins or crimp 70. Two of such pins are illustrated on FIGS. 2 and 3, and in a typical installation, four such pins may be provided equally circumferentially distributed about the interior of the skirt.

Each roll pin is hollow as illustrated in FIG. 4, and includes a region extending the length of the pin where the wall of the pin is unjoined, as indicated at 71. Each pin is snugly fitted within an accommodating bore provided in the skirt, as exemplified by bore 75. A roll pin is made of metal and in mounting a pin within a bore the pin is compressed to reduce its size to enable the insertion of the pin into the bore. On being positioned, the wall of the pin urges enlargement which results in the pin being firmly mounted in place with the mounting withstanding extreme temperature ranges and dislodgement by jars or shocks.

The exposed end of each pin coacts with a ramp 72 and catch 74 provided on the outside of tube 14 (refer to FIG. 4). The ramp and catch might extend over typically less than about 20% of the circumference of the filler tube meaning that only a small amount of rotary movement of the cap results in a pin reaching and becoming seated within a corresponding catch 74.

Because the cap is quick-closing and does not become firmly held until the pins seat in catches 74, and this occurs with only a small fraction of a turn, there is minimal tendency for a user to place the cap on the filler tube and turn it only enough to provide temporary holding. The user becomes accustomed too fully seating the cap on returning it to the filler tank.

Mounted on the underside of cap top 38 is an annular seal (sealing element) or gasket member 78. Such conveniently may be made of a resilient compressible foam material such as a polyurethane foam. The sealing element provides a seal between rim 54 of the closure member and the underside of the cap. This is important in inhibiting dust build up within the interior of the cup-shaped closure member.

With the cap assembly closing off the top of the filler tube the coil spring is compressed slightly with the closure member being displaced upwardly on pillar 42 somewhat from its limited position defined by snap ring 66. The coil spring resiliently urges rim 54 downwardly in sealing relation against shoulder 20, and ring 26 seated within groove 24. There is a slight compression of seal member element 78 where such extends about the upper surface of rim 54.

The construction described is well enabled to withstand damage that typically might occur in a so-called drop test. In a drop test, there is a tendency for the wall of the tank to be flattened somewhat at the location of the filler tube. This frequently results in the opening to the filler tube being deformed from a true circular opening, to one having an ovate configuration. Even though there is such deformation in shoulder 20 defining the opening at the top of the filler tube, in the construction described a proper seal still is maintained between ring 26 and rim 54 which overlies it.

While an embodiment of the invention has been described, obviously variations and modifications are possible without departing from the invention.

It is claimed and desired to secure by Letters Patent:

1. A fuel cap and filler tube combination comprising:
   a cap having a top and a depending circumferential skirt joined to the top,
   a filler tube having an annular shoulder at the top of the tube with the shoulder extending about the top of the tube and defining an inlet opening for the tube, the shoulder having inner and outer margins forming the top of the shoulder,
   a closure member disposed on the under side of the cap having an annular rim overlying said shoulder,
   a spring biasing the closure member toward the filler tube interposed between the closure member and the top of the cap,
   an annular groove indented downwardly into said shoulder disposed intermediate said inner and outer margins,
   an elastomer ring resting in said groove and said ring having a portion extending thereabout throughout its length projecting upwardly beyond the inner and outer margin of said shoulder,
   said closure member having an annular rim with a flat lower surface on the under side of the rim and said surface lying against said ring and being pressed against the ring by said spring.

2. A fuel cap and fuel filler tube combination comprising:
   a cap having a top and a depending circumferential skirt joined to the top,
   a filler tube having an annular shoulder at the top of the tube with the shoulder extending about the top of the tube and defining an inlet opening for the tube, the shoulder having inner and outer margins forming the top of the shoulder,
   said cap further including a column portion joined to the top and projecting downwardly from the underside of the top and extending through said inlet opening,
   a closure member disposed on the underside of the cap having an annular rim overlying said shoulder, said closure member having a center opening through which said column extends,
   a spring biasing the closure member toward the tube interposed between the closure member and the top of the cap,
   means interposed between the closure member and column portion defining a lower limit position for the closure member on the column,
   an annular groove indented downwardly into said shoulder disposed intermediate said inner and outer margins,
   an elastomer ring resting in said groove and said ring having a portion extending thereabout throughout its length projecting upwardly beyond the inner and outer margin of said shoulder,
   said closure member having an annular rim with a flat lower surface on the underside thereof lying against said ring and pressed against the ring by said spring, said post centering the closure member so that the flat surface of the rim throughout its length overlies the ring.

3. The combination of claim 2, which further comprises an annular, yieldably compressible and resilient sealing element mounted against the underside of said cap top, said rim having an upper surface opposite said lower surface and said upper surface engaging said sealing element with the lower surface of said rim against said ring, and which further comprises helical cam surfaces circumferentially distributed about said filler tube and a hollow crimp pin associated with each cam surface mounted on said skirt and projecting inwardly from the skirt, said crimp pins engaging said cam surfaces with said lower surface pressed against said ring by said spring.

4. The combination of claim 2, which further comprises a fusible element supporting an end of the spring and said fusible element on fusing causes relaxation of the spring and the pressure exerted by the spring.

5. The combination of claim 3, which further comprises a fusible element supporting an end of the spring which on fusing causes relaxation of the spring and pressure exerted by the spring.

* * * * *